Oct. 30, 1951 R. O. GRAY 2,572,853

SUBSCRIPTION TYPE SIGNAL TRANSLATING APPARATUS

Original Filed Dec. 2, 1947 2 SHEETS--SHEET 1

RICHARD O. GRAY
*INVENTOR.*

BY Bruce L Birchard

HIS AGENT

SUBSCRIPTION TYPE SIGNAL TRANSLATING APPARATUS

Original Filed Dec. 2, 1947 2 SHEETS—SHEET 2

RICHARD O. GRAY
INVENTOR.
BY Bruce T. Birchard
HIS AGENT

Patented Oct. 30, 1951

2,572,853

UNITED STATES PATENT OFFICE 2,572,853

SUBSCRIPTION TYPE SIGNAL TRANSLATING APPARATUS

Richard O. Gray, Broadview, Ill., assignor to Zenith Radio Corporation, a corporation of Illinois Continuation of application Serial No. 789,268, December 2, 1947. This application February 5, 1949, Serial No. 74,821

11 Claims. (Cl. 178—5.1)

Figure 1:
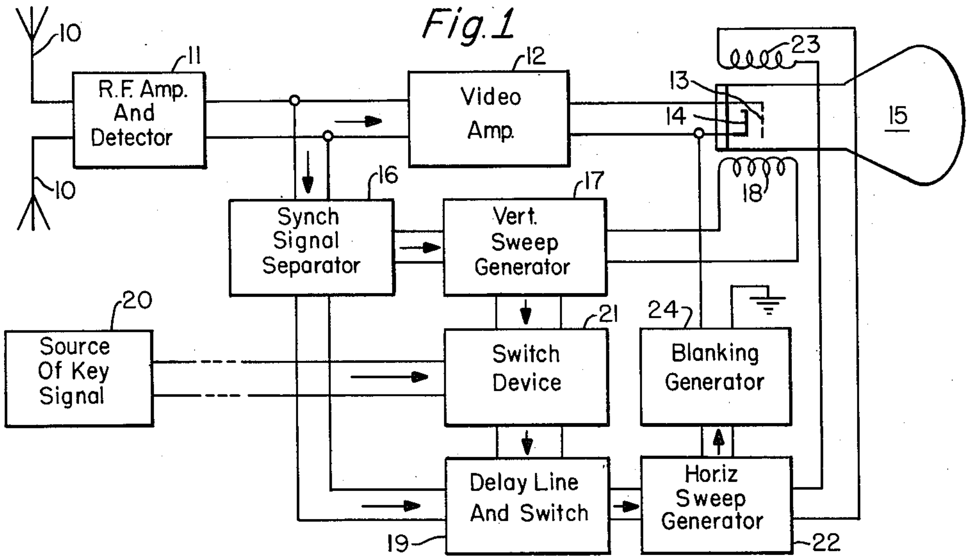

This invention relates to subscription type signal translating apparatus and is a continuation of the copending application of Richard O. Gray, Serial No. 789,268, filed December 2, 1947, for Cathode-Ray Tube Blanking Circuits, assigned to the same assignee as the present application, now abandoned.

The copending applications of Alexander Ellett et al., Serial No. 742,374, filed April 18, 1947 for Radio-Wire Signalling System, now Patent No. 2,510,046 dated May 30, 1950, and of Erwin M. Roschke, Serial No. 773,848, filed September 13, 1947, now Patent No. 2,547,598, granted April 3, 1951, for Image Transmission Systems, both of which applications are assigned to the same assignee as the present application, specifically disclose and claim certain subscription type television transmitting and receiving apparatus. The Ellett et al. application is directed to a system in which a composite television signal is transmitted to authorized subscribers in two parts over separate channels, and the Roschke application is particularly directed to a system in which the time relation between the video-signal component and a synchronizing-signal component of a composite television signal is recurrently altered between two different modes or conditions, a key signal indicating the instantaneous mode of operation being transmitted over a second channel.

In order to accomplish decoding of a coded composite television signal of the type disclosed in the Roschke application, the scanning of the receiver-reproducing device is delayed with respect to the composite signal during intervals of operation corresponding to one of the two modes. By so delaying the scanning during reception in one mode, while permitting normal scanning during reception in the other mode, the video-signal component during reception in the altered mode is effectively advanced with respect to the synchronizing-signal component, and decoding is effected. There is, however, an additional problem encountered in the use of such a system. The delay in the scanning with respect to the composite television signal results in a disconcerting flicker at each edge of the viewing screen, the reasons for which are to be more fully explained hereinafter.

It is a primary object of the present invention to provide a receiver for reproducing an intelligible image from a composite television signal coded as set forth in the Roschke application while eliminating disconcerting flicker on minor portions of the viewing screen.

It is a further object of the present invention to provide a novel blanking voltage generator for producing blanking voltage pulses at spaced time intervals to extinguish the trace of the image-reproducing device during scanning intervals of such minor portions.

Still a further object of the present invention is to provide a novel blanking voltage generator to produce blanking voltage pulses to extinguish the trace of the image-reproducing device during portions of the normal trace interval.

One embodiment of the present invention provides apparatus for utilizing a composite television signal which includes video-signal components and synchronizing-signal components and which occurs alternately in two different modes in which the time relations between the video-signal components and the synchronizing-signal components are different, and for concurrently utilizing a key signal instantaneously indicating the mode of the composite signal and received over a separate channel. The apparatus includes an image-reproducing device having a viewing screen area, and a scanning system is associated with the image-reproducing device to effect recurrent scanning of the screen area in one direction. A decoding device is coupled to the scanning system, and this device acts to delay the scanning with respect to the composite signal during reception in one of the modes while permitting normal scanning of the area during reception in the other of the modes, whereby the average illumination of minor portions of the screen area is materially changed by a transition from one mode to the other while such transition has substantially no effect on the average illumination of the major portion of the screen area. A blanking voltage generator is synchronized with the scanning system and is coupled to the image-reproducing device to extinguish the trace thereof during the scanning intervals of the minor portions of non-uniform illumination.

Figure 3:
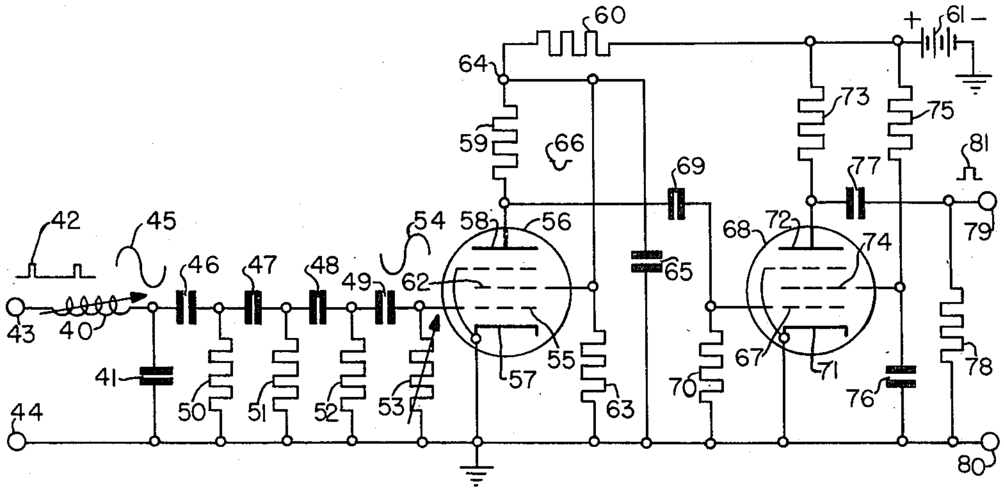
Figure 2:
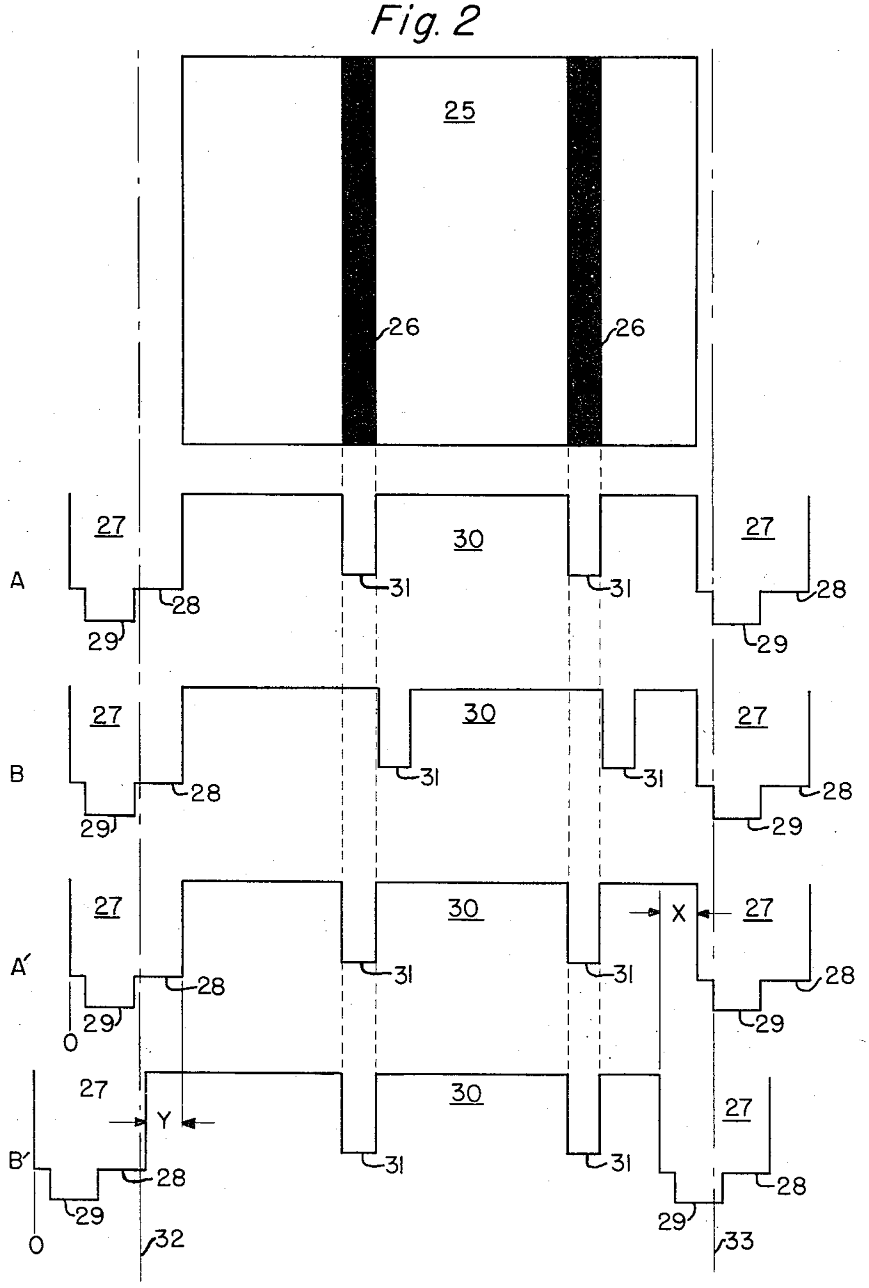

The features of the present invention which are believed to be novel are set forth with particularity in the appended claims. The present invention, together with further objects and advantages thereof, may best be understood, however, by reference to the following description taken in connection with accompanying drawings in which:

Figure 1 is a schematic block diagram of a television receiver embodying the present invention, Figure 2 is a simplified graphical representation particularly useful in understanding the invention, and Figure 3 is a schematic circuit diagram of a preferred embodiment of the invention.

With reference to the system of Figure 1, radiated composite television signals, including video-signal component and a synchronizing-signal component, are received by an antenna 10 and are transmitted to a tunable radio-frequency amplifier and detector 11. The detected composite signals from the output of system 11 are amplified by a video amplifier 12 and are applied between the grid or control electrode 13 and the ungrounded cathode 14 of an image-reproducing device 15, thereby to modulate the electron beam of such device. Synchronizing-signal pulses are separated from the output of system 11 by means of a synchronizing-signal separator 16 which may be of conventional construction, and the vertical synchronizing-signal pulses are supplied to a vertical sweep generator 17 the output of which is supplied to the vertical deflection coils 18 associated with image-reproducing device 15.

The horizontal synchronizing-signal pulses are supplied to a delay line and switch network 19 which is so arranged as to allow the horizontal synchronizing-signal pulses to pass undelayed in the presence of a key signal from an external source 20 and to delay the horizontal synchronizing-signal pulses in the absence of a key signal from source 20, or vice versa. Such a control of the horizontal synchronizing-signal pulses is effected by means of a switch device 21, in which the vertical synchronizing-signal pulses are superimposed on the rectified key signal in the manner disclosed in the aforementioned copending applications, connected between the key signal source 20 and delay line and switch network 19. The horizontal synchronizing-signal pulses from delay line and switch 19 are supplied to a horizontal sweep generator 22 the output of which is coupled to the horizontal deflection coils 23 associated with image-reproducing device 15. Horizontal sweep generator 22 and deflection coils 23 constitute a scanning system associated with image-reproducing device 15 to cause recurrent scanning of the viewing screen area of device 15 in the horizontal direction.

Horizontal sweep signals from horizontal sweep generator 22 are employed to trigger a blanking voltage generator 24 which supplies at spaced time intervals to the cathode 14 of device 15 blanking voltage pulses of sufficient magnitude to bias device 15 beyond cut-off thereby to extinguish the trace of such device.

Reference may be had to the aforementioned copending applications for a discussion of the construction and manner of operation of components 19 and 21. Components 11, 12, 16, 17, and 22 may be of conventional construction. The use of a blanking voltage generator 24 has not been previously disclosed, and such is the subject of the present application.

It is to be understood that certain variants of the system shown in Figure 1 may be made without departing from the scope of the invention. For example, blanking voltage generator 24 may be modified to produce negative blanking voltage pulses, in which case such pulses are supplied to the control electrode 13 rather than to the cathode 14 of device 15. Furthermore, the receiver may be provided with a background reinsertion device between the video amplifier 12 and the image-reproducing device 15; similarly, other conventional circuits may be provided where refinements are desired.

In order more clearly to explain the operation of the receiver of Figure 1, and in order to show how disconcerting edge flicker is produced in a receiver constructed in accordance with the aforementioned copending applications, reference is made to Figure 2, wherein there are shown in idealized and simplified form several pertinent waveforms. A rectangle 25 contains a pair of vertically arranged black sections 26 and represents a simple image to be televised. Waveform A represents one horizontal line interval of the composite television signal received by antenna 10 of the system of Figure 1 for each line or horizontal scanning interval of one frame. The horizontal line interval shown at A comprises synchronizing-signal components 27 individually including horizontal blanking pedestals 28 and horizontal synchronizing-signal pulses 29 superimposed on pedestals 28, and video-signal components 30 including voltage pulses 31 representing black sections 26. Waveform A represents a first mode embodying an arbitrary normal time relation between the video-signal components 30 and the synchronizing-signal components 27; for convenience this mode will be termed the "normal mode."

Waveform B represents a second mode of the composite television signal in each line or horizontal scanning interval of a succeeding frame in which the time relation between the video-signal components 30 and the synchronizing-signal components 27 is different from that in the normal mode; as compared with waveform A, the video-signal component 30 of waveform B has been delayed with respect to the synchronizing-signal component 27 in order to code the composite television signal during that frame. For convenience, the mode illustrated in waveform B is termed the "altered mode."

A consideration of waveforms A and B makes it apparent that image 25 as reproduced by a conventional television receiver, in which the timing of the scanning system associated with the image-reproducing device is not altered to compensate for the difference in the time relation between the video-signal component 30 and the synchronizing-signal component 27, is distorted. The black sections 26 change their positions on the viewing screen on the reproducing device from time to time in a horizontal reciprocating fashion. The reproduced image is changed in position whenever the time relation between the video-signal component 30 and the synchronizing-signal component 27 is altered from one condition to another, i. e., each time the mode is changed at the transmitter (not shown).

In the receiver of Figure 1, intelligible reproduction is effected by proper correlation of the composite television signals illustrated by waveforms A and B with a key signal indicating the instantaneous time relation between video-signal component 30 and synchronizing-signal component 27. In such a receiver, decoding is achieved by delaying, during periods of reception in the altered mode, the horizontal scanning of the image-reproducing device with respect to the composite television signal. The effect of introducing such a delay in the receiving scanning apparatus may more readily be understood by reference to waveforms A′ and B′ which correspond respectively to reception in the normal mode as shown at A and reception in the altered mode as shown at B. In order to show the effect of delaying the horizontal scanning with respect to the composite television signal, it has been convenient to displace horizontally the zero-time reference of waveform B′ with respect to that of waveform A′ by an amount corresponding to the maximum alteration of the time relation between the video-signal component 30 and the synchronizing-signal component 27. This displacement of time reference has been indicated in the figure by the vertically misaligned zero-time references associated with waveforms A′ and B′.

At this point, a brief discussion of the scanning mechanism associated with the image-reproducing device is in order. A conventional horizontal sweep generator may comprise a blocking oscillator which is triggered by the horizontal synchronizing-signal pulses at regular spaced intervals. The output of such a blocking oscillator is converted to a saw-tooth current which is applied to the horizontal deflection coil to provide horizontal scanning. In the system of Figure 1 horizontal synchronizing-signal pulses from synchronizing-signal separator 16 are delayed during periods of reception in the altered mode by delay line and switch 19. Thus, in each transition from normal mode to altered mode or vice versa, the spacing between two successive pulses driving the horizontal sweep generator 22 is altered; however, since many synchronizing-signal pulses occur between transitions from mode to mode, all but one pair for each transition of the horizontal synchronizing-signal pulses are uniformly spaced in time. Hence, the transition from mode to mode effects a change in the phase of the scanning current applied to the horizontal deflection coil without substantially affecting its average value. At the same time, the horizontal scanning covers a particular area on the viewing screen of the image-reproducing device 15 independently of the mode of reception. The horizontal sweep length has been indicated in Figure 2 by vertical lines 32 and 33, which indicate respectively the beginning and end of each horizontal scan as a function of its position on the viewing screen of the image reproducing device. Thus, points in vertical alignment between waveforms A′ and B′ represent vertically aligned points on the viewing screen of the image-reproducing device.

During intervals of reception in the normal mode, the signal received at the grid of the image-reproducing device is represented by waveform A′ and is reproduced in the normal manner. In order to provide proper alignment between picture elements in the altered mode and corresponding picture elements in the normal mode, thereby to provide decoded reproduction of the image, the presence of a key signal during intervals of reception on the altered mode introduces a time delay in the horizontal scanning of the image-reproducing device with respect to the composite television signal. This delay is indicated graphically in Figure 2 by the increase of the time interval between the zero-time reference and the start of the scan as indicated by vertical line 32 in waveform B′ with respect to waveform A′. In this manner, corresponding picture information, represented in the video-signal component 30 by voltage pulses 31, is brought into proper alignment for intelligible picture reproduction.

That the delay of the horizontal scanning during reception in the altered mode, in addition to decoding the reproduced image, results in disconcerting edge flicker is apparent when it is considered that during reception in the normal mode (waveform A′), a region X at the end of each scanning interval is illuminated; region X is not illuminated during periods of reception in the altered mode because of the presence of the front porch of the blanking pedestal 28 during such periods. Similarly, during reception in the altered mode (waveform B′), a region Y at the beginning of each scanning interval is illuminated; region Y is not illuminated during periods of reception in the normal mode because of the presence of the back porch of the blanking pedestal 28 during such periods. The average illumination of regions X and Y, representing minor portions of the screen area, is therefore materially changed by a transition from reception in one mode to reception in the other, while the average illumination of the major portion of the viewing screen area is unaffected by such a transition. This condition manifests itself as an undesirable edge flicker at each side border of the viewing screen of the image-reproducing device, even when the coded television signal is decoded by proper application of the key signal. In order to eliminate this disconcerting edge flicker on the viewing screen of the image-reproducing device, the present invention provides a blanking voltage generator located in the receiver for biasing the image-reproducing device to cut-off during the scanning intervals of regions X and Y, which intervals correspond to portions of the normal line scanning interval. If desired, the blanking voltage pulses may be made of such width as to overlap, either partially or completely, blanking pedestals 28.

Referring now to Figure 3, a preferred embodiment of the blanking voltage generator 24 of Figure 1 is shown comprising a series resonant circuit which includes a variable inductor 40 and a condenser 41. Output 42 from the horizontal sweep generator 22 (Figure 1) is impressed between the input terminals 43 and 44 and is converted to a substantially sinusoidally varying control potential wave 45 across capacitance 41. Alternatively, any voltage in synchronism with the horizontal sweep voltage may be employed as input to terminals 43 and 44.

In the illustrated case, the control potential wave is shifted in phase by a suitable network which may comprise several series condensers 46, 47, 48 and 49 and associated shunt resistors 50, 51, 52 and 53, and the phase-shifted sinusoidal potential wave 54 is applied to the control electrode 55 of an electron discharge device 56. The cathode 57 of device 56 is connected directly to ground, and the anode 58 is connected through a pair of series resistors 59 and 60 to the positive terminal of a source of unidirectional operating potential, here shown as a battery 61, the negative terminal of which is grounded. The screen electrode 62 of device 56 is connected to ground through a resistor 63 and directly to the junction 64 of resistors 59 and 60. Junction point 64 is bypassed to ground by a condenser 65.

Device 56 and its associated circuit elements comprise a clipping and amplifying circuit which acts on the input voltage 54 at the control grid 55. By making grid resistor 53 variable, the clipping level is made adjustable; hence the width of the pulses 66 appearing at the anode 58 may be set at will. By making inductor 40 variable, the phase of the anode pulses 66 may be made adjustable.

The output appearing at the anode 58 of device 56 is coupled to the control electrode 67 of a second electron discharge device 68 through a coupling condenser 69. Control electrode 67 is connected to ground through a grid leak resistor 70. The cathode 71 of device 68 is grounded, and the anode 72 is connected through a load resistor 73 to the positive terminal of operating potential source 61. Operating voltage for the screen electrode 74 is obtained from source 61 through a screen resistor 75, and screen electrode 74 is bypassed to ground by means of a condenser 76. Output is taken from the anode 72 of device 68 through a coupling condenser 77 and is applied across an output resistor 78, across which are provided output terminals 79 and 80.

Device 68 and its associated circuits act as top clipping and amplifying means, and the output 81 appearing at terminals 79 and 80 comprises substantially square-topped pulses, the time duration of these pulses being determined by the setting of resistance 53. Since the phase of the voltage pulses 66 is dependent on the setting of inductor 40, the output blanking voltage pulses 81 are adjustable both as to duration and phase. In a practical application, the phase of the blanking voltage output is effectively advanced so that the input signals 42 are anticipated by the output 81.

Alternatively, suitable networks may be employed to produce continuous voltages of other forms, for example, sawtooth, rectified sine wave, or the like, from which may be derived output pulses of varying width and phase determined by the clipping level of device 56. It is also within the scope of this invention to employ a single tube operating as both a bottom clipper and a top clipper, of usual construction, in place of devices 56 and 68 and the associated circuits.

The circuit shown in Figure 3 provides output pulses of the same polarity as that of the input pulses; in the usual case, both input and output pulses are positive. The positive output pulses are then applied as blanking voltage pulses to the ungrounded cathode of the image-reproducing device. However, it is entirely within the scope of this invention to provide negative blanking voltage pulses to the grid of the image-reproducing device.

The blanking voltage pulses, being triggered by the output of the horizontal sweep generator which is in turn responsive to the key signal indicating the instantaneous mode of the composite signal, shifts from one edge of the horizontal scanning interval to the other, and these pulses are phased to blank the image-reproducing device during portion X of the horizontal scan when reception is in the normal mode and during portion Y of the horizontal scan when reception is in the altered mode. Thus, the blanking voltage pulses shift from one edge of the scan to the other with each transition from one mode to the other.

While there have been shown and described certain preferred embodiments of the invention, it is understood that various modifications may be made, and it is contemplated in the appended claims to cover all such modifications as fall within the true spirit and scope of the invention.

I claim:

1. Apparatus for utilizing a composite television signal including video-signal components and synchronizing-signal components and occurring alternately in two different modes in which the time relations between said components are different and for concurrently utilizing a key signal instantaneously indicating the mode of said composite signal and received over a separate channel, said apparatus comprising: an image-reproducing device having a viewing screen area; a scanning system associated with said image-reproducing device to cause recurrent scanning of said area in one direction; a decoding device coupled to said scanning system and including time delay apparatus responsive to said key signal to introduce a time delay in the scanning of said area during reception in one of said modes to compensate the change in time relation between said video-signal and synchronizing signal components, whereby the average illumination of minor portions of said screen area is materially changed by a transition from reception in said one mode to reception in said other mode while the average illumination of the major portion of said screen area is substantially unaffected by said transition; and a blanking voltage generator coupled to said image-reproducing device and synchronized with said scanning system for extinguishing the trace of said image-reproducing device throughout the scanning intervals of said minor portions.

2. Apparatus for utilizing a composite television signal including video-signal components and synchronizing-signal components and occurring alternately in two different modes in which the time relations between said components differ by a predetermined amount and for concurrently utilizing a key signal instantaneously indicating the mode of said composite signal and received over a separate channel, said apparatus comprising: an image-reproducing device having a viewing screen area; a scanning system associated with said image-reproducing device to cause recurrent scanning of said area in one direction; a decoding device coupled to said scanning system and including time delay apparatus responsive to said key signal to introduce a time delay of said predetermined amount in the scanning of said area during reception in one of said modes to compensate the change in time relation between said video-signal and synchronizing-signal components, whereby the average illumination of minor portions of said screen area is materially changed by a transition from reception in said one mode to reception in said other mode while the average illumination of the major portion of said screen area is substantially unaffected by said transition; and a blanking voltage generator coupled to said image-reproducing device and synchronized with said scanning system for extinguishing the trace of said image-reproducing device throughout the scanning intervals of said minor portions.

3. Apparatus for utilizing a composite television signal including video-signal components and synchronizing-signal components and occurring alternately in two different modes in which the time relations between said components are different and for concurrently utilizing a key signal instantaneously indicating the mode of said composite signal and received over a separate channel, said apparatus comprising: an image-reproducing device having a viewing screen area; a scanning system associated with said image-reproducing device to cause recurrent scanning of said area in one direction; a decoding device coupled to said scanning system and including time delay apparatus responsive to said key signal to introduce a time delay in the scanning of said area during reception in one of said modes to compensate the change in time relation between said video-signal and synchronizing-signal components, whereby the average illumination of opposed marginal portions of said screen area is materially changed by a transition from reception in said one mode to reception in said other mode while the average illumination of the intermediate portion of said screen area is substantially unaffected by said transition; and a blanking voltage generator coupled to said image-reproducing device and synchronized with said scanning system for extinguishing the trace of said image-reproducing device throughout the scanning intervals of at least one of said marginal portions.

4. Apparatus for utilizing a composite television signal including video-signal components and synchronizing-signal components and occurring alternately in two different modes in which the time relations between said components are different and for concurrently utilizing a key signal instantaneously indicating the mode of said composite signal and received over a separate channel, said apparatus comprising: an image-reproducing device having a viewing screen area; a scanning system associated with said image-reproducing device to cause recurrent scanning of said area in one direction; a decoding device coupled to said scanning system and including time delay apparatus responsive to said key signal to introduce a time delay in the scanning of said area during reception in one of said modes to compensate the change in time relation between said video-signal and synchronizing-signal components, whereby the average illumination of opposed marginal portions of said screen area is materially changed by a transition from reception in said one mode to reception in said other mode while the average illumination of the intermediate portion of said screen area is substantially unaffected by said transition; a blanking voltage generator responsive to said synchronizing-signal components to develop blanking voltage pulses and responsive to said key signal to shift said pulses from the scanning interval of one of said marginal portions to that of the other of said marginal portions with each transition from reception in one of said modes to reception in the other of said modes; and means coupling said pulses from said blanking voltage generator to said image-reproducing device for extinguishing the trace thereof throughout the scanning intervals of said marginal portions.

5. Apparatus for utilizing a composite television signal including video-signal components and synchronizing-signal components and occurring alternately in two different modes in which the time relations between said components are different and for concurrently utilizing a key signal instantaneously indicating the mode of said composite signal and received over a separate channel, said apparatus comprising: an image-reproducing device having a viewing screen area; a scanning system associated with said image-reproducing device to cause recurrent scanning of said area in one direction; a decoding device coupled to said scanning system and responsive to said key signal to introduce a time delay in the scanning of said area during reception in one of said modes to compensate the change in time relation between said video-signal and synchronizing-signal components, whereby the average illumination of minor portions of said screen area is materially changed by a transition from reception in said one mode to reception in said other mode while the average illumination of the major portion of said screen area is substantially unaffected by said transition; and a blanking voltage generator synchronized with said scanning system and comprising an input circuit responsive to a signal supplied from said decoding device for producing a control potential wave, a phase shifting network coupled to said input circuit for changing the phase of said potential wave with respect to said supplied signal, a clipping circuit coupled to said network for producing blanking voltage pulses at spaced time intervals determined by said phase-shifted potential wave, and an output circuit coupled to said clipping circuit and to said image-reproducing device for utilizing said pulses to extinguish the trace of said image-reproducing device throughout the scanning intervals of said minor portions.

6. Apparatus for utilizing a composite television signal including video-signal components and synchronizing-signal components and occurring alternately in two different modes in which the time relations between said components are different and for concurrently utilizing a key signal instantaneously indicating the mode of said composite signal and received over a separate channel, said apparatus comprising: an image-reproducing device having a viewing screen area; a scanning system associated with said image-reproducing device to cause recurrent scanning of said area in one direction; a decoding device coupled to said scanning system and responsive to said key signal to introduce a time delay in the scanning of said area during reception in one of said modes to compensate the change in time relation between said video-signal and synchronizing-signal components, whereby the average illumination of minor portions of said screen area is materially changed by a transition from reception in said one mode to reception in said other mode while the average illumination of the major portion of said screen area is substantially unaffected by said transition; and a blanking voltage generator synchronized with said scanning system and comprising an input circuit responsive to a signal supplied from said decoding device for producing a control potential wave, an adjustable phase shifting network coupled to said input circuit for changing at will the phase of said potential wave with respect to said supplied signal, a clipping circuit coupled to said network for producing blanking voltage pulses at spaced time intervals determined by said phase-shifted potential wave, and an output circuit coupled to said clipping circuit and to said image-reproducing device for utilizing said pulses to extinguish the trace of said image-reproducing device throughout the scanning intervals of said minor portions.

7. Apparatus for utilizing a composite television signal including video-signal components and synchronizing-signal components and occurring alternately in two different modes in which the time relations between said components are different and for concurrently utilizing a key signal instantaneously indicating the mode of said composite signal and received over a separate channel, said apparatus comprising: an image-reproducing device having a viewing screen area; a scanning system associated with said image-reproducing device to cause recurrent scanning of said area in one direction; a decoding device coupled to said scanning system and responsive to said key signal to introduce a time delay in the scanning of said area during reception in one of said modes to compensate the change in time relation between said video-signal and said synchronizing-signal components, whereby the average illumination of minor portions of said screen area is materially changed by a transition from reception in said one mode to reception in said other mode while the average illumination of the major portion of said screen area is substantially unaffected by said transition; and a blanking voltage generator synchronized with said scanning system and comprising an input circuit including an inductor and a condenser at least one of which is variable for producing in response to a signal supplied from said decoding device a substantially sinusoidal control potential wave, a phase shifting network coupled to said input circuit for changing the phase of said potential wave with respect to said supplied signal, a clipping circuit coupled to said network for producing blanking voltage pulses at spaced time intervals determined by said phase-shifted potential wave, and an output circuit coupled to said clipping circuit and to said image-reproducing device for utilizing said pulses to extinguish the trace of said image-reproducing device throughout the scanning intervals of said minor portions.

8. Apparatus for utilizing a composite television signal including video-signal components and synchronizing-signal components and occurring alternately in two different modes in which the time relations between said components are different and for concurrently utilizing a key signal instantaneously indicating the mode of said composite signal and received over a separate channel, said apparatus comprising: an image-reproducing device having a viewing screen area; a scanning system associated with said image-reproducing device to cause recurrent scanning of said area in one direction; a decoding device coupled to said scanning system and responsive to said key signal to introduce a time delay in the scanning of said area during reception in one of said modes to compensate the change in time relation between said video-signal and synchronizing-signal components, whereby the average illumination of minor portions of said screen area is materially changed by a transition from reception in said one mode to reception in said other mode while the average illumination of the major portion of said screen area is substantially unaffected by said transition; and a blanking voltage generator synchronized with said scanning system and comprising an input circuit for producing a control potential wave in response to a signal supplied from said decoding device, a phase shifting network coupled to said input circuit for changing the phase of said potential wave with respect to said supplied signal, a bottom clipping circuit coupled to said phase shifting network for producing blanking voltage pulses at spaced time intervals determined by said potential wave, and an output circuit including a top clipping circuit for squaring said pulses and coupled to said bottom clipping circuit and to said image-reproducing device for utilizing said squared pulses to extinguish the trace of said image-reproducing device throughout the scanning intervals of said minor portions.

9. A television receiver including: an image-reproducing device having a viewing screen and including means responsive to the video-signal and synchronizing-signal components of a received composite television signal for controlling said device to illuminate a first area on said screen during a first series of intervals and to illuminate during a second series of intervals a second area the major portion of which overlaps said first area, whereby edge portions of said screen are illuminated less frequently than said major portion; and a blanking voltage generator coupled to said device and responsive to said synchronizing-signal components for developing blanking voltage pulses to extinguish the trace of said device throughout the scanning intervals of said edge portions.

10. A television receiver including: an image-reproducing device having a viewing screen and including means responsive to the video-signal and synchronizing-signal components of a received composite television signal for controlling said device to illuminate a first area on said screen during a first series of intervals and to illuminate during a second series of intervals a second area the major portion of which overlaps said first area, whereby edge portions of said screen are illuminated less frequently than said major portion; and a blanking voltage generator comprising an input circuit responsive to said synchronizing-signal components for producing a control potential wave, a phase shifting network coupled to said input circuit for changing the phase of said potential wave, a clipping circuit coupled to said network for producing blanking voltage pulses at spaced time intervals determined by said potential wave, and an output circuit coupled to said clipping circuit and to said image-reproducing device for utilizing said pulses to blank said device throughout the scanning intervals of said edge portions.

11. A television receiver including: an image-reproducing device having a viewing screen and including means responsive to the video-signal and synchronizing-signal components of a received composite television signal for controlling said device to illuminate a first area on said screen during a first series of intervals and to illuminate during a second series of intervals a second area the major portion of which overlaps said first area whereby edge portions of said screen are illuminated less frequently than said major portion; and a blanking voltage generator comprising an input circuit including an inductor and a condenser at least one of which is variable and responsive to said synchronizing-signal components for producing a substantially sinusoidal control potential wave, an adjustable phase shifting network coupled to said input circuit for changing at will the phase of said wave, a clipping circuit coupled to said network for producing blanking voltage pulses at spaced time intervals determined by said potential wave, and an output circuit coupled to said clipping circuit and to said image-reproducing device for utilizing said pulses to blank said device throughout the scanning intervals of said edge portions.

RICHARD O. GRAY.

REFERENCES CITED

The following references are of record in the file of this patent:

UNITED STATES PATENTS

| Number | Name | Date |
|---|---|---|
| 2,251,525 | Rosenthal | Aug. 5, 1941 |
| 2,320,699 | Homrighous | June 1, 1943 |
| 2,369,783 | Homrighous | Feb. 20, 1945 |
| 2,398,641 | Homrighous | Apr. 16, 1946 |
| 2,402,067 | Mathes | June 11, 1946 |
| 2,468,256 | Espley | Apr. 26, 1949 |
| 2,472,774 | Mayle | June 7, 1949 |
| 2,477,615 | Isbister | Aug. 2, 1949 |
| 2,488,386 | Eddy | Nov. 15, 1949 |